United States Patent
Hayden, Sr.

(10) Patent No.: US 6,257,226 B1
(45) Date of Patent: Jul. 10, 2001

(54) METAL-CUTTING SAW HAVING STRAIGHT AND SET TEETH AND METHOD OF MAKING

(75) Inventor: Robert C. Hayden, Sr., Branford, CT (US)

(73) Assignee: Kapman AB, Sandviken (SE)

( * ) Notice: Subject to any disclaimer, the term of this patent is extended or adjusted under 35 U.S.C. 154(b) by 0 days.

(21) Appl. No.: 09/490,110

(22) Filed: Jan. 24, 2000

(51) Int. Cl.$^7$ ............................................. B28D 1/12
(52) U.S. Cl. ................................. 125/22; 83/848
(58) Field of Search ............................ 451/540, 548; 125/12, 13.01, 15, 18, 22; 83/848, 849, 850, 851, 676, 661, 846, 847

(56) References Cited

U.S. PATENT DOCUMENTS

| | | |
|---|---|---|
| 2,637,355 | 5/1953 | Chapin . |
| 2,671,947 * | 3/1954 | Linde ........................................ 125/15 |
| 3,154,839 * | 11/1964 | Kleber, Jr. et al. ..................... 125/18 |
| 3,863,401 * | 2/1975 | Schwarzkopf et al. ................. 125/15 |
| 4,179,967 | 12/1979 | Clark . |
| 4,590,837 | 5/1986 | Nanba . |
| 4,727,788 | 3/1988 | Yoshida et al. . |
| 5,331,876 | 7/1994 | Hayden, Sr. . |

* cited by examiner

Primary Examiner—Derris H. Banks
(74) Attorney, Agent, or Firm—Burns, Doane, Swecker & Mathis, L.L.P.

(57) ABSTRACT

A metal saw for making long cuts through thick soft metals such as aluminum, copper or stainless steel, where friction, cutting force and scarring of the cut sides are minimized at a low production cost by grinding all teeth with a top edge inclined right or left 5 to 10 degrees, followed by setting some but not all teeth at a setting angle sized so that the top edges of the set teeth extend substantially at a right angle to a center plane of the body of the saw.

10 Claims, 2 Drawing Sheets

METAL-CUTTING SAW HAVING STRAIGHT AND SET TEETH AND METHOD OF MAKING

BACKGROUND OF THE INVENTION

The present invention relates to the cutting teeth on a metal-cutting saw.

Saws for cutting metal are commonly made with a base of flexible steel of uniform thickness, and teeth projecting from an edge of the base. Some of the teeth are set to produce a cut which is wider than the thickness of the base, to avoid friction between the base and the sides of the cut. Each tooth is usually provided with a tip formed of a material which is harder and more wear resistant than the base, such as high speed steel or cemented carbide. The cutting edges on the tooth tips are commonly sharpened by grinding, to minimize the cutting force. The saws can be made as continuous loops or as band saws, or straight strips such as hack saws.

For the shape of the teeth, numerous variations have been suggested, as has been shown in U.S. Pat. Nos. 2,637,355, 4,727,788, 4,179,967 and others. The great variation of tooth shapes is the result of the many requirements on the saw performance, such as ability to cut different metals, to cut with reduced vibrations, to produce smooth cut surfaces, to be produced with low cost and high precision, and to remove metal chips from the cut. For optimal performance in difficult applications it may be necessary to use specific tooth shapes which may be clearly different from normal tooth shapes. Similar requirements also apply to saws for cutting wood, as described in U.S. Pat. No. 4,590,837 and others, although the fibrous character of wood will require completely different tooth shapes that are not applicable to metal saws.

Normally, the ability to make a straight cut in metal is achieved by providing the set teeth with sloping cutting edges (e.g., see the sloping edges 32a of FIG. 3), so that a deviation of the saw to one side (e.g., away from the center of the cut) will increase the chip thickness and cutting force of the teeth set to that side, returning the saw to the previous center of the cut. When entering a cut, a straight cut is achieved by including, along with set teeth, teeth which are straight and symmetrical to a center plane of the base (i.e., non-set), taller than the set teeth and preferably provided with chamfers to make the lateral force component linearly dependent on the deviation from a straight line of cut.

For long cuts through thick metal, the vibrations can be minimized by varying the distances between teeth as is well known. However, when a great number of teeth are cutting at the same time, the force required to convey the chips becomes important.

When cutting metals, the cutting force depends to a large extent upon the friction force to convey the chips out of the cut. This is most noticeable for soft pliable metals as aluminum, where the chips curl up into large tight rolls before they fracture. If such rolls rub against the walls of the cut, they will cause friction, scar the walls and block further chip formation, especially if they are twisted or turned around. In the sawing of regular carbon steel, the chips fracture in small pieces before they curl up. This means that common saw tooth shapes for carbon steel (such as in FIG. 3) will not be suitable when sawing aluminum.

One common feature of metal-cutting saw teeth is that the cutting edges of set teeth (i.e., the cutting edges 32a of the teeth 32 in FIG. 3) form blunt obtuse angles α with the walls (31) of the cut, because they become inclined during the setting process and possibly chamfered as disclosed in U.S. Pat. No. 2,635,327. Straight teeth (33 or 41) also form blunt angles with the walls of the cut, because they are made with chamfers, as described in U.S. Pat. No. 5,331,876. This means that short fractured chips will be deflected towards the center of the cut, minimizing the friction and scarring of the walls. Curled chips, however, will be shaped as rolls with a roll-up axis parallel to the cutting edge and will rub and chafe against the walls (31) as soon as they encompass a full turn.

Inclining the tops of the teeth the other way to form an acute angle rather than an obtuse angle with the walls is common for saws that cut fibrous materials like wood as shown in FIG. 5 of U.S. Pat. No. 4,590,837. Such teeth will also deflect chips towards the center, because the cutting edge in that case is not along the top of the tooth, but rather along the side of the tooth.

In saws for sawing metals, as in FIGS. 3 and 4, the tooth top is the cutting edge, and if the angle α were acute, the chips would rub against the wall (31) right from the beginning even if they were soon fractured. Providing the set teeth with edges 42a at a right or nearly right angle has been suggested in FIGS. 4a and 4b of U.S. Pat. No. 4,727,788, and in DE G8807350.5 (shown herein in FIG. 4), but in both cases this requires a grinding operation after setting, which may be difficult and expensive since it is performed without proper back support and on selected teeth only.

The stable cutting of a straight cut requires that lateral deviations of the saw produce well-defined lateral force components proportional to the deviations. In most metal cutting saw designs, those force components are produced by the inclined edges of the set teeth, but if the edges were instead at right angles to the side wall (31), the lateral forces could be produced by large symmetric chamfers (43) formed on the straight teeth (41), as shown in FIG. 4. Chamfered straight teeth have the additional advantage of producing chips of restricted width, which are easily conveyed, but also have the severe disadvantage of requiring three separate grinding operations with very strict symmetry. Also, the corner (45) where the chamfer meets the top edge is also subject to more wear than straight edge portions.

SUMMARY OF THE INVENTION

The present invention concerns a metal saw where the friction force to convey the chips is minimized by choosing other tooth angles than in prior art, and the cutting force variations needed for the ability to cut straight are differently assigned to the teeth, as well as a method to produce such saws in an efficient and economic way.

The present invention relates to a metal-cutting saw having right and left sides and comprising a base and cutting teeth projecting from an edge of the base. Each tooth has two side edges and a top edge defining a metal-cutting edge. Each top edge is pre-ground at an inclination to form an acute angle with respect to one of the side edges and an obtuse angle with respect to the other side edge. The teeth are arranged such that one-half of the acute angles and one-half of the obtuse angles are disposed adjacent the right side, and one-half of the acute angles and one-half of the obtuse angles are disposed adjacent the left side. Some of the teeth are straight such that the side edges thereof are substantially coplanar with respective side surfaces of the base, and such that an end of the top edge thereof forming the acute angle defines a high end of the straight tooth. The high end is spaced farther from the base than a low end of the top edge forming the obtuse angle. The remaining teeth are set. One-half of the set teeth are set to the left and one-half of the set teeth are set to the right. Each set tooth is set by a setting angle sized to cause the top edge thereof to extend substantially perpendicular to a center plane of the base. This type of saw is more efficient than other saws for making long cuts in soft metals such as aluminum, copper or stainless austenitic steel.

BRIEF DESCRIPTION OF THE DRAWINGS

The objects and advantages of the invention will become apparent from the following detailed description of preferred embodiments thereof in connection with the accompanying drawings in which like numerals designate like elements and in which.

DETAILED DESCRIPTION OF THE PREFERRED EMBODIMENTS OF THE INVENTION

Figure 1:
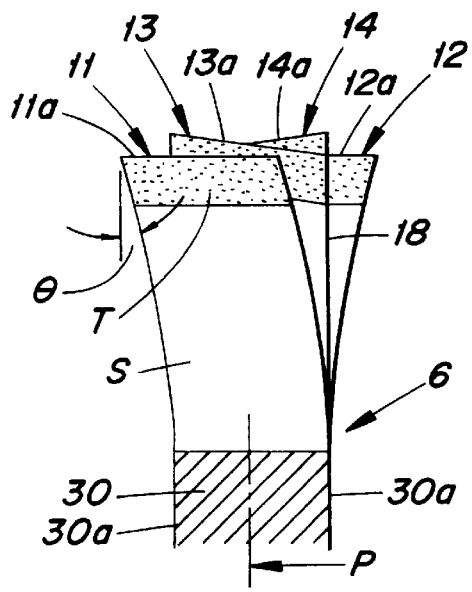
FIG. 1 is a cross-section through a first embodiment of a saw according to the invention.
Figure 2:
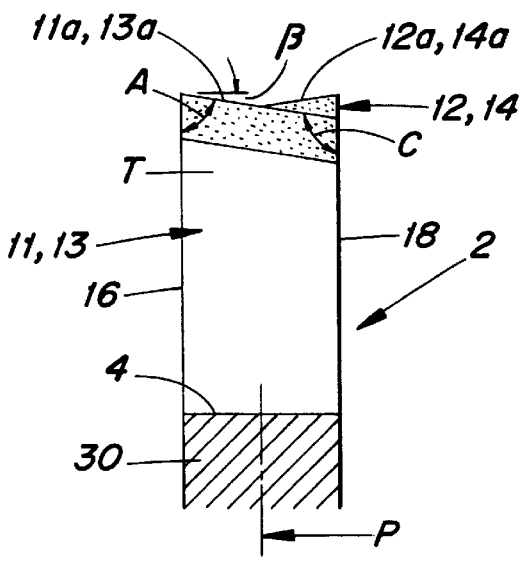
FIG. 2 depicts the same saw before setting of the teeth.
Figure 3:
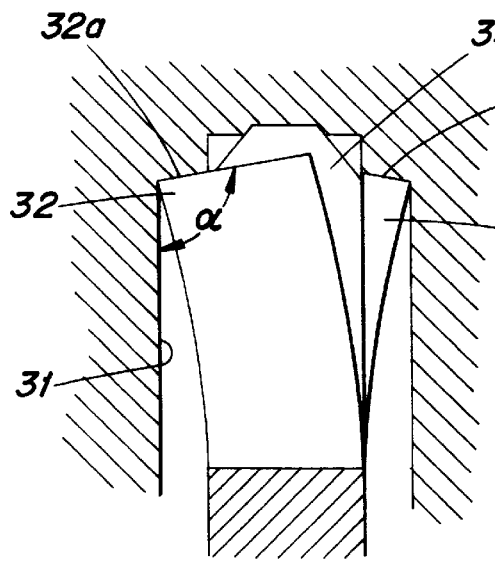
FIG. 3 a common prior art saw metal-cutting.

Depicted in FIG. 2 is a steel strip (2) including a base (30) having an edge along which cutting teeth (11–14) have been formed. Then, some of the teeth are set to produce a metal-cutting saw (6) shown in FIG. 1.

According to the invention, all teeth, before setting, are produced as shown in FIG. 2 with top (cutting) edges (11a, 12a, 13a, 14a) inclined by a relatively small angle β, between 5 and 10 degrees, with respect to a side (16 or 18) of the tooth oriented parallel to a center plane P of the saw. Thus, each of those cutting edges forms an acute angle A with one of the tooth sides (16, 18) and an obtuse angle C with the other of the tooth sides. Two of the teeth (11, 13) have their top edges (11a, 13a) inclined to the right such that the acute angle A thereof is disposed adjacent the left side of the tooth. Those teeth 11, 13 alternate with two teeth 12, 14 having their top edges (12a, 14a) inclined to the left such that the acute angle thereof is disposed adjacent the right side of the saw. This inclination can be accomplished by grinding at least the clearance surface. For saw blades where larger groups of teeth are ground at the same time, this can be done in two passages of a grinding wheel, a first passage making the first, second, fifth, sixth, etc., tooth inclinations to the right, a second passage making the third, fourth, seventh, eighth, etc., tooth inclinations to the left. If teeth are individually ground, alternating inclination angles are easily achieved by a suitable programming of the grinder.

As a second step, to form a saw (6), some, but not all of the teeth are set, half of them to the left (see tooth 11), half of them to the right (see tooth 12). The setting angle Θ is chosen to cause the top edges (11a, 12a) of the set teeth (11, 12) to become oriented substantially perpendicular to the center plane P of the saw body (30), i.e., substantially perpendicular to the side wall (31) of a cut made by the saw. That is, the angle Θ is at least nearly equal to angle β. Normally, the setting angle Θ will be about 1–2 degrees larger than the angle β, with the difference being due to the shear deformation of the metal in the tooth. Thus, the top edges (11a, 12a) will normally not deviate by more than about 2 degrees from a perpendicular relationship with the side wall (31).

The teeth (13, 14), which are still straight (i.e., which were not set), will have their top edges (13a, 14a) inclined alternatingly right and left, and will include short vertical side edges (16, 18) that are parallel with respective side surfaces (30a) of the base (30). An inclination angle β of only between 5 and 10 degrees is so small that the non-linear dependence of the lateral cutting force component upon the lateral deviation of the saw blade is hidden by the larger and linearly varying lateral components on the inclined top edges. The chips formed by each straight tooth will have a cross-section of uniform thickness except for a narrow portion near the center where the edge crosses the path of a preceding edge. Such chips of a soft material will curl up as slightly conical rolls without rubbing or chafing against the cut walls, and will permit a minimal force for cutting and conveying chips.

Figure 4:
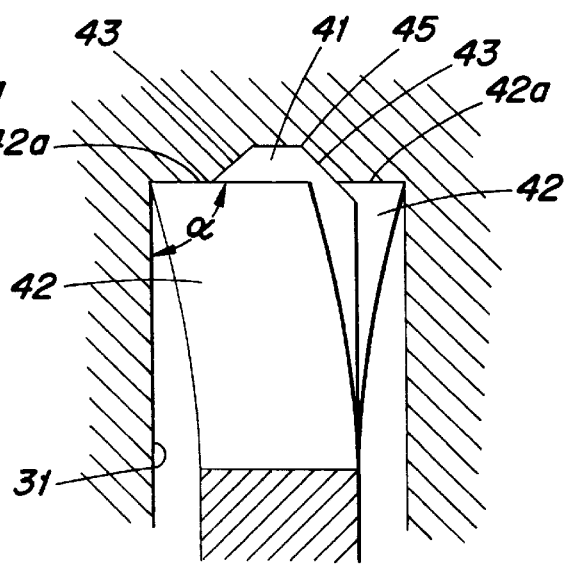
FIG. 4 is a prior art metal-cutting saw according to DE G8807350.5.

Straight teeth with large chamfers (41), such as shown in FIG. 4, will suffer an increased cutting force when cutting soft metals, since the chip rolls from the chamfers will interfere with chip rolls from the middle part of the edge. Straight teeth without chamfers will also suffer an increased cutting force since the chip rolls will be slightly wider than the teeth and will interfere with the initial cut.

By contrast, a metal saw according to the invention will require a minimal cutting force, will convey curled-up chips easily out of the cut and will produce straight smooth cuts, especially when sawing soft materials as aluminum, copper or stainless steel. In addition, they will be easy to manufacture since no additional operation is required after setting.

Figure 5:
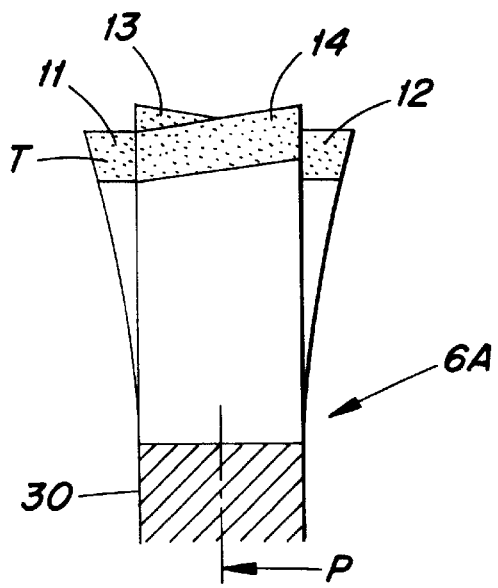
FIG. 5 is a cross section through a second embodiment of a saw according to the invention.

The setting pattern may vary, but there should preferably be recurring groups of four or six teeth. If groups of four teeth are used, each consecutive group of four teeth should contain one tooth (11) set left, one tooth (12) set right, one straight tooth (14) with top inclined to the left and one straight tooth (13) with top inclined to the right. One preferred pattern of teeth could be, in succession: tooth (11), followed by tooth (13), followed by tooth (14), followed by tooth (12), as depicted in FIG. 1. Another preferred pattern of four teeth would be, in succession: tooth (14), followed by tooth (11), followed by tooth (13), followed by tooth (12), as depicted on the saw (6A) shown in FIG. 5. These respective patterns are then repeated over again.

Figure 6:
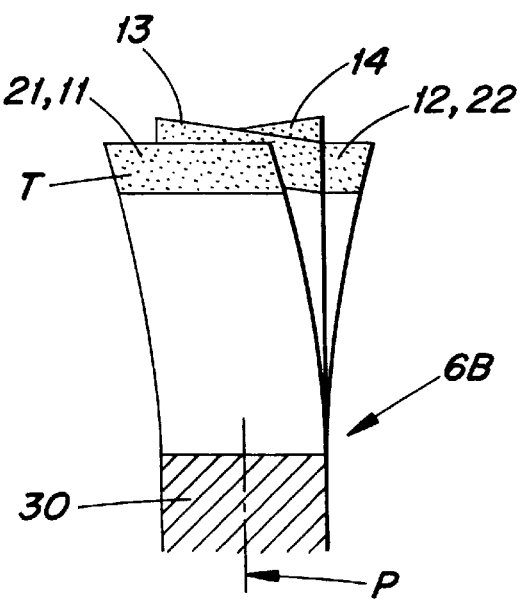
FIG. 6 is a cross section through a third embodiment of a saw according to the invention.

Each consecutive group of six teeth should contain one straight tooth (14) with top inclined to the left, one straight tooth (13) with top inclined to the right, two left set teeth (11) and two right set (teeth (12), as depicted on the saw (6B) shown in FIG. 6. The six teeth can be arranged in any desired succession.

The top part T of each tooth on which the cutting edge is formed should be made from a harder material than the body of the saw. Preferably, the top part is an insert T made from cemented carbide and individually welded onto a steel body S of the tooth before grinding, as is conventional.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed is:

1. A metal-cutting saw having right and left sides and comprising a base and cutting teeth projecting from an edge of the base; each tooth having two side edges and a top edge defining a metal-cutting edge; each top edge being pre-ground at an inclination to form an acute angle with respect to one of the side edges and an obtuse angle with respect to the other side edge; the teeth arranged such that one-half of the acute angles and one-half of the obtuse angles are disposed adjacent the right side, and one-half of the acute angles and one-half of the obtuse angles are disposed adjacent the left side; some of the teeth being straight such that the side edges thereof are substantially coplanar with respective side surfaces of the base, and such that an end of the top edge thereof forming the acute angle defines a high end of the straight tooth, the high end being spaced farther from the base than a low end of the top edge forming the obtuse angle; the remaining teeth being set; one-half of the set teeth being set to the left, and one-half of the set teeth being set to the right; each set tooth being set by a setting angle sized to cause the top edge thereof to extend substantially perpendicular to a center plane of the base.

2. The metal-cutting saw according to claim 1 wherein the top edge of each set tooth deviates by no more than two degrees from perpendicular with respect to the center plane.

3. The metal-cutting saw according to claim 2 wherein the teeth are arranged such that a pair of teeth having the acute angles located adjacent the right side is followed by a pair of teeth having the acute angles located adjacent the left side.

4. The metal-cutting saw according to claim 3 wherein the teeth comprise recurring groups of four teeth, the four teeth consisting of: a set tooth set to the left, a set tooth set to the right, a straight tooth having a high end disposed adjacent the right side, and a straight tooth having a high end disposed adjacent the left side.

5. The metal-cutting saw according to claim 4 wherein the order of the four teeth comprises: the set tooth set to the left, followed by the straight tooth having a high end disposed adjacent the left side, followed by the straight tooth having a high end disposed adjacent the right side, followed by the set tooth set to the right.

6. The metal-cutting saw according to claim 4 wherein the order of the four teeth is the straight tooth having a high end disposed adjacent the left side, followed by the set tooth set to the left, followed by the straight tooth having a high end disposed adjacent the right side, followed by the set tooth set to the right.

7. The metal-cutting saw according to claim 2 wherein the teeth comprise recurring groups of six teeth, the six teeth consisting of: a straight tooth having a high end disposed adjacent the left side, a straight tooth having a high end disposed adjacent the right side, two set teeth set to the left, and two set teeth set to the right.

8. The metal-cutting saw according to claim 1 wherein each tooth comprises a steel body and a piece of cemented carbide affixed to a free end of the steel body to form the top edge of the tooth.

9. A method of producing a metal-cutting saw comprising the steps of:

A) providing a steel strip comprising a base and teeth projecting from an edge of the base, each tooth being straight and having two side edges disposed coplanar with respective side surfaces of the base, and a top edge extending between the side edges;

B) grinding the top edge of each tooth such that the top edge forms an acute angle with respect to one side edge of the respective tooth, and an obtuse angle with respect to the other side edge of the tooth, the teeth arranged such that one-half of the acute angles and one-half of the obtuse angles are disposed adjacent the right side, and one-half of the acute angles and one-half of the obtuse angles are disposed adjacent the left side; and C) setting only some of the teeth, whereby one-half of the set teeth are set to the left, and one-half of the set teeth are set to the right, the remaining non-set teeth remaining straight, the setting angle for the set teeth being such that a top edge of each set tooth is disposed substantially perpendicularly to a center plane of the base.

10. The method according to claim 9 wherein the setting angle of step C is such that the top edges of the teeth deviate by no more than two degrees from perpendicular with the center plane.

* * * * *